United States Patent [19]

Plumridge et al.

[11] Patent Number: 4,484,676

[45] Date of Patent: Nov. 27, 1984

[54] ACCUMULATING SHUTTLE CONVEYOR

[75] Inventors: Robert W. Plumridge, Garden City; James H. Patrick, Redford, both of Mich.

[73] Assignee: Centri-Spray Corporation, Livonia, Mich.

[21] Appl. No.: 508,993

[22] Filed: Jun. 29, 1983

Related U.S. Application Data

[63] Continuation of Ser. No. 267,561, May 27, 1981, abandoned.

[51] Int. Cl.³ .............................................. B65G 25/00
[52] U.S. Cl. .................................... 198/718; 198/744
[58] Field of Search ........................ 198/718, 744, 751

[56] References Cited

U.S. PATENT DOCUMENTS 3,369,650  2/1968  Caretto et al. ................... 198 X/744
3,888,344  6/1975  Major ................................. 198/718

Primary Examiner—Joseph E. Valenza
Assistant Examiner—Dennis J. Williamson
Attorney, Agent, or Firm—Joseph W. Farley

[57] ABSTRACT

A conveyor with a plurality of article supporting stations has a reciprocatable shuttle mechanism equipped with dogs which engage and advance articles one station on each advance stroke of the shuttle. All dogs are set in article engaging position at the end of each return stroke of the shuttle. A series of accumulating stations extends from the unloading toward the loading end of the conveyor, and accumulating mechanism actuatable independently of the shuttle is operable to reset the dogs of each of these stations to non-engaging position in response to the presence of articles. A control system normally operates the conveyor on a simple cycle of successive advance and return strokes of the shuttle until, with articles detected at the last two stations, the accumulating mechanism is cycled prior to a shuttle advance stroke.

19 Claims, 9 Drawing Figures

ACCUMULATING SHUTTLE CONVEYOR

This is a continuation of application Ser. No. 267,561, filed May 27, 1981, now abandoned.

This invention relates to improvements in conveyors of the type having a plurality of article supporting stations extending from the loading end of the conveyor downstream to the unloading end thereof; a shuttle mechanism which includes selectively operable article-engaging devices and which is reciprocated on successive cycles to move articles ahead one station on each cycle; and accumulation means for disabling the article engaging devices as the conveyor stations become occupied by articles.

Such conveyors are used, for example, to advance articles from one processing station to the next and to accumulate articles between the processing operations as may be required due to variations in the rates at which the operations are performed or the articles are supplied.

Prior examples of such conveyors are found in U.S. Pat. No. 3,369,650 wherein the accumulation means employs a fluid-pressure operated control for disabling the article-engaging devices, and in U.S. Pat. No. 3,545,600 wherein the accumulation means employs a mechanical linkage for disabling the article-engaging devices. In each of these prior conveyors the accumulation means disables the article-engaging devices serially at successive stations extending upstream from the unloading end of the conveyor as these stations become occupied. Also, in these and other prior accumulating shuttle conveyors, the accumulation means is operable or is actuated during each cycle of the shuttle mechanism and is provided at all of the article supporting stations of the conveyor other than the first, or loading station.

The present invention provides an accumulating shuttle conveyor in which the shuttle mechanism and the accumulation means are separately activated and controlled so that the conveyor is operable on repetitive cycles as a simple shuttle conveyor until the article occupied status of certain conveyor stations is such as to require an accumulation action, which is then automatically initiated. Further, the accumulation means is provided only at a minimum number of key stations and is operable to deactivate the entire conveyor when these key stations are occupied.

The overall result achieved by the invention is the provision of a structurally simplified accumulating shuttle conveyor which is operable with minimized power requirements and wear on the conveyor components.

An accumulating shuttle conveyor of the invention comprises a frame having a loading end and an unloading end; means carried by the frame for supporting articles at successive equally spaced stations between the loading and unloading ends, including a loading station adjacent to the loading end, a second station adjacent to the loading station, an unloading station adjacent to the unloading end, and a plurality of intermediate accumulating stations including an upstream station following the second station and a downstream station preceding the unloading station; a shuttle mechanism movably supported by the frame, and drive means normally operable for moving the shuttle mechanism on return and advance strokes between advance and return positions, each stroke having a length corresponding to the spacing between successive stations; a series of article advancing devices or dogs mounted along the shuttle mechanism at a spacing between successive dogs corresponding to the spacing between successive stations, each dog being movable between an article advancing position and a non-advancing position; means for setting all dogs in article advancing position on the return stroke of the shuttle mechanism; accumulation means for resetting the dogs at said intermediate stations in non-advancing position in response to the presence of articles thereat, actuating means for operating said accumulating means in an accumulation cycle independently of the operation of the drive means for moving the shuttle mechanism; and control means for initiating an accumulation cycle of operation of said accumulation means in response to the presence of articles at least at said unloading station and at said downstream accumulating station.

Preferably, the control means includes a shuttle mechanism return position sensor for initiating an accumulation cycle in the return position of the shuttle mechanism in response to the presence of articles at the unloading and downstream accumulating stations. The control means also preferably includes the combination of a shuttle mechanism advance position sensor and an article sensor at the second conveyor station for alternatively initiating an accumulation cycle in the advance position of the shuttle mechanism in response to the presence of articles at each of the unloading, the downstream accumulating and the second conveyor stations. This alternative accumulation cycle will deactivate the operation of the shuttle mechanism drive means when the presence of articles is detected at each of the accumulation stations.

Other features and advantages of the invention will appear from the description to follow of the presently preferred embodiment disclosed in the accompanying drawings, in which.

Figure 1:
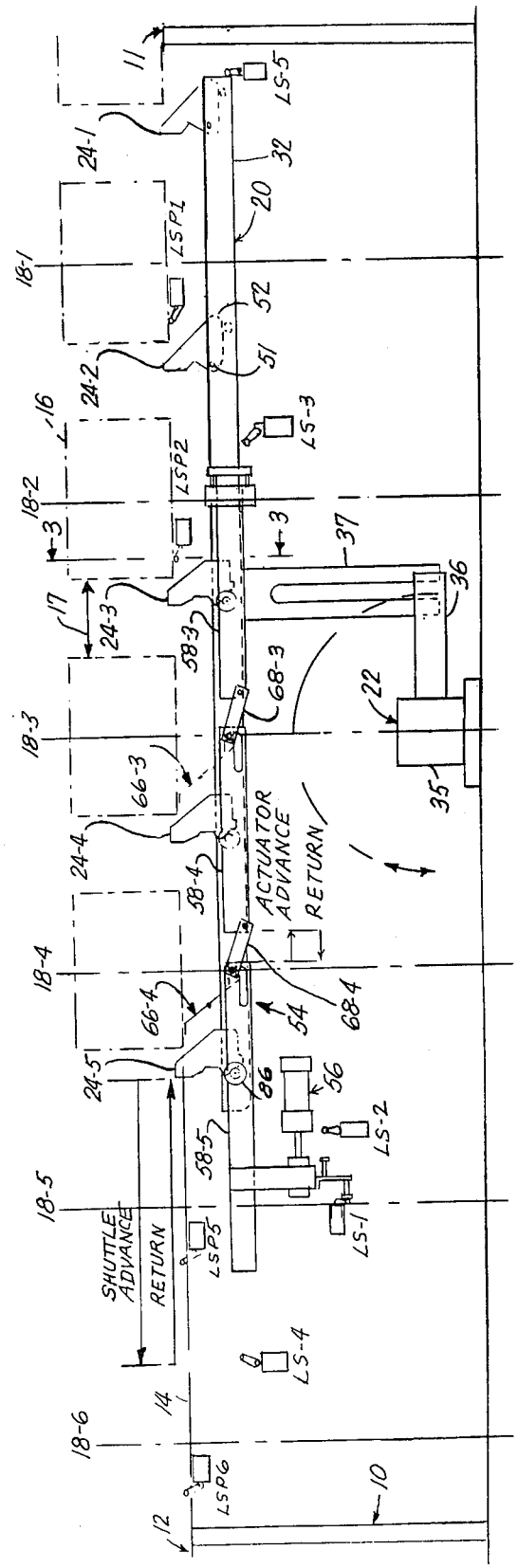
FIG. 1 is a side elevation schematically illustrating the principal mechanical and control elements of a conveyor of the invention.

As schematically shown in FIG. 1, an accumulating shuttle conveyor of the invention comprises a frame 10 having a loading end 11, an unloading end 12, and means 14 carried by the frame for supporting articles 16 at successive equally spaced stations between the loading and unloading stations. There are six such stations 18-1 through 18-6 in the particular conveyor illustrated in FIG. 1. However, the number of stations may be varied as required, but will include:

a loading station 18-1 adjacent to the loading end 11, a second station 18-2 adjacent to the loading station 18-1, an unloading station 18-6 adjacent to the unloading end 12, and a plurality of intermediate accumulating stations which include an upstream station 18-3 following the second station 18-2 and a downstream station 18-5 preceding the unloading station 18-6. Although only one other accumulating station 18-4 is shown, additional ones may be provided.

A shuttle mechanism 20 is supported by the frame 10 and is movable by suitable drive means 22 on return and advance strokes between an advance position and a return position, the return position being shown in FIG. 1. A series of article advancing devices or dogs 24-1 to 24-5 is mounted on the shuttle mechanism at a spacing between successive dogs corresponding to the spacing between successive stations, and each dog is movable between the article advancing position shown in FIG. 1 and a nonadvancing position. While the length of the return and advance strokes of the shuttle mechanism corresponds in general to the spacing between successive stations, the stroke length exceeds the station spacing to an extent such as to provide a clearance 17 between successive articles 16 sufficient to enable all dogs to be set in article advancing position on the return stroke of the shuttle mechanism 20 by setting means to be described below.

Figure 3:
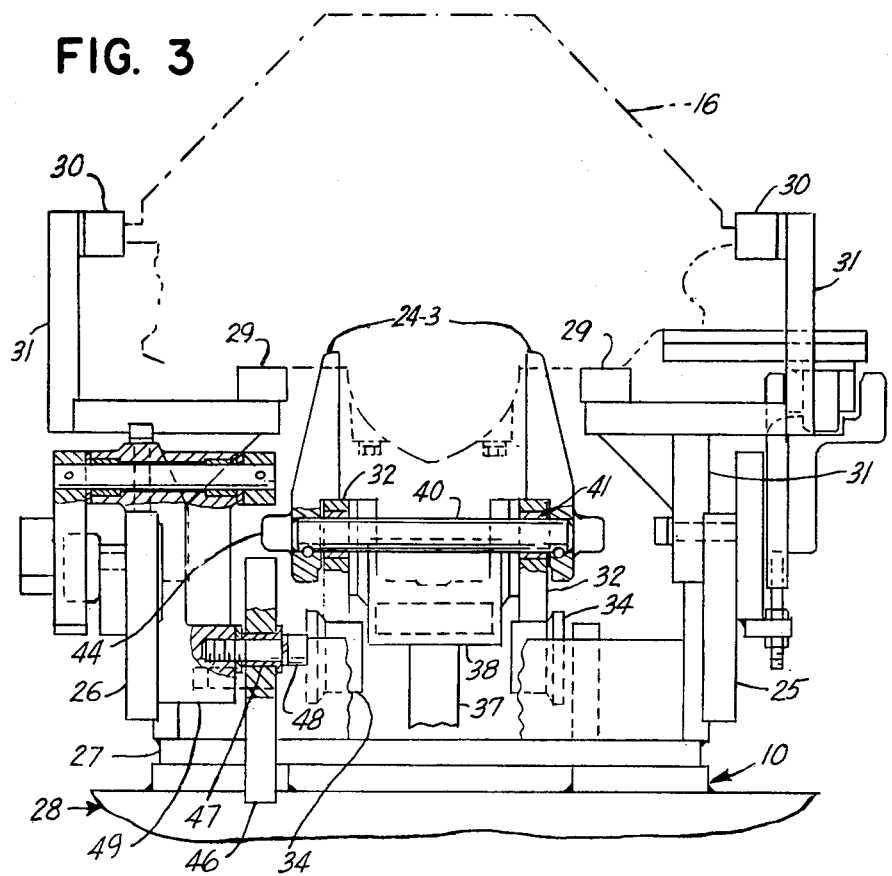
FIG. 3 is a transverse elevation, partly in section, as indicated by the line 3—3 of FIG. 1, looking in the direction of travel of an article at an accumulating station of the conveyor and showing the dog positioning elements.
Figure 4:
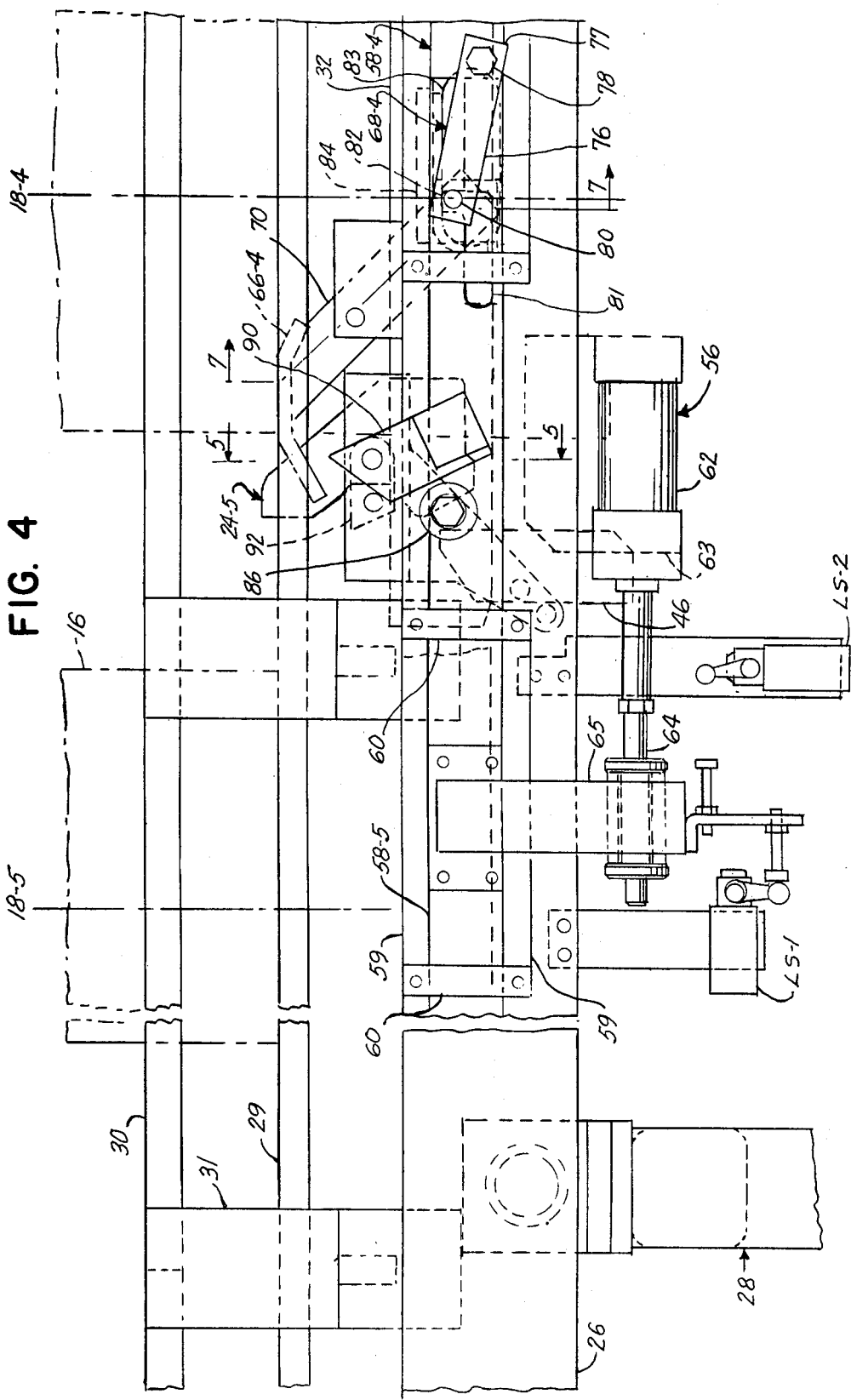
FIG. 4 is a fragmentary side elevation showing the construction of the portion of the conveyor at stations 4 and 5 of FIG. 1.

Details of the foregoing construction are shown in FIGS. 3 and 4. The frame 10 includes two transversely spaced side plates 25 and 26 which extend the length of the conveyor and are interconnected at spaced intervals by cross members 27 attached to sub-frames 28 that support the side plates vertically. The article supporting means 14 is formed by a pair of parallel supporting rails 29 and a pair of parallel guide rails 30 (FIG. 3) secured to the side plates by brackets 31. The shuttle mechanism 20 consists of a pair of longitudinally parallel, transversely spaced bars 32 suitably interconnected and supported at intervals by rollers 34 carried by the frame cross members 27. The drive means 22 shown in FIG. 1 is a commercially available item that includes a drive unit 35 having a crank arm 36 which engages a yoke 37 mounted between and secured to the shuttle bars 32 by a drive bracket 38 shown in FIG. 3. Oscillation of the crank arm 36 by the drive unit 35 imparts return and advance stroke movements to the shuttle bars 32.

Figure 6:
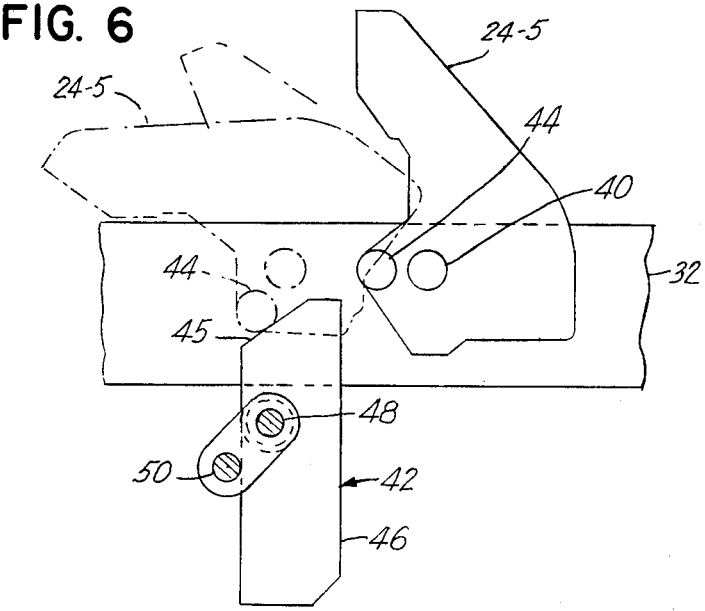
FIG. 6 is a fragmentary side elevation, taken substantially as indicated by the line 6—6 of FIG. 5, showing a dog setting pawl.

Each of the dogs 24-3 to 24-5 at the accumulating stations actually consists of a pair of dogs attached, as shown in FIG. 3, to a shaft 40 pivotally supported in bearings 41 carried by the shuttle bars 32 so that each pair of the dogs 24-3 to 24-5 is freely movable in unison. These dogs at the accumulating stations are of the over-center type, biased by weight to remain in each of their article advancing and non-advancing positions. Thus if any of the dogs 24-3 to 24-5 at the accumulating stations engages an article 16 on the return stroke of the shuttle mechanism, that dog will be moved to the non-advancing position as a result of such engagement, will pass under the article in the non-advancing position shown in broken line in FIG. 6, and, as the shuttle mechanism nears the end of the return stroke, will be placed in article advancing position by setting means 42.

Figure 5:
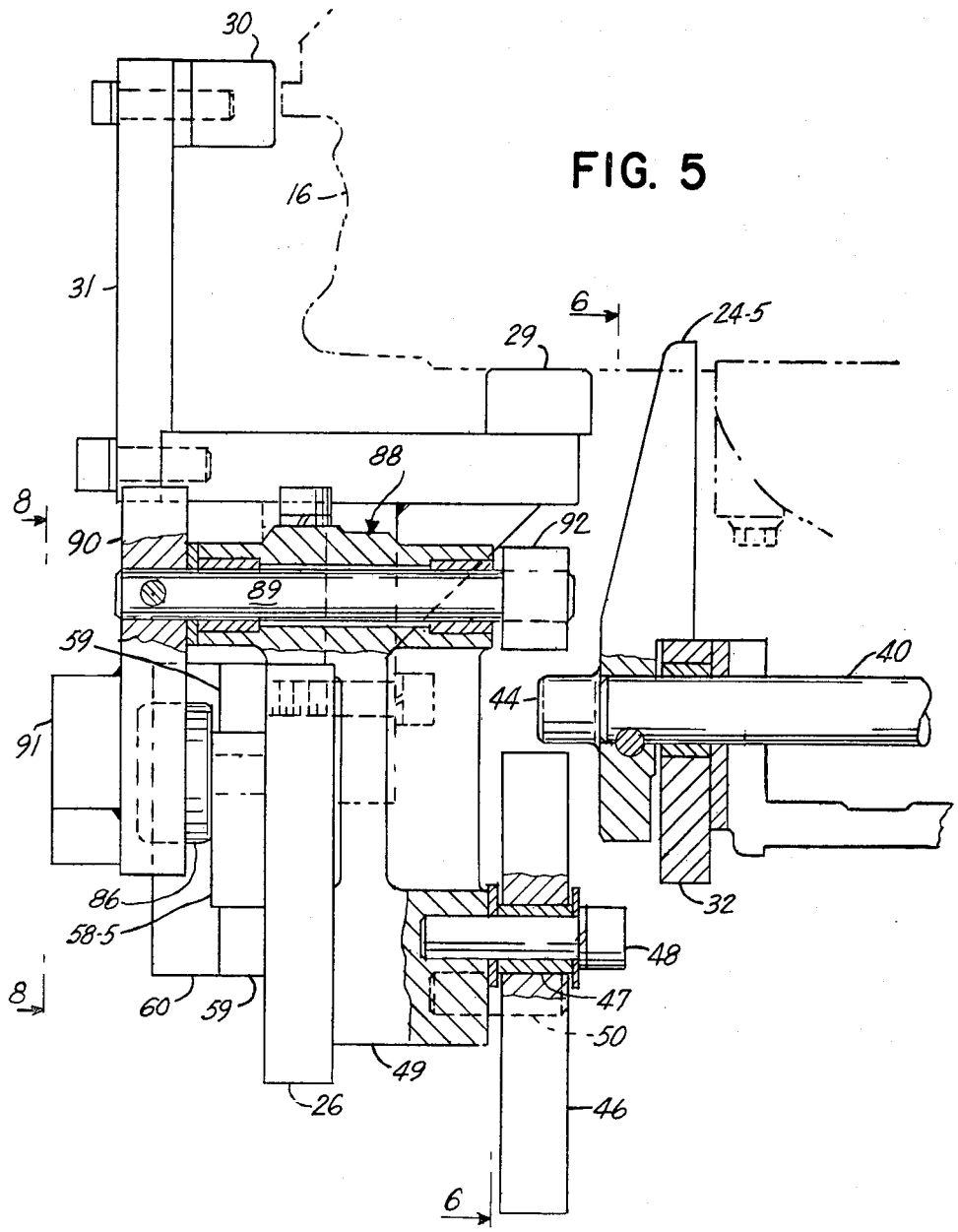
FIG. 5 is an enlarged fragmentary transverse section taken substantially as indicated by the line 5—5 of FIG. 4.

This setting means for the dogs 24-3 to 24-5 at each of the accumulating stations comprises a projection or boss 44 extending from the side of the dog at a radial spacing from the axis of the shaft 40 (FIG. 6) engageable with cam means 45 carried by the frame side plate 26 at each of the accumulating stations. The cam means 45 is provided on a finger 46 pivotally supported by a bushing 47 mounted on a bolt 48 secured to a fitting 49 which in turn is connected to the frame side plate 26 as shown in FIGS. 3 and 5. The finger 46 is normally biased by weight to the upright position shown in FIG. 6 and defined by a pin 50 projecting from the fitting 49 so that the finger 46 is free to pivot in the counterclockwise but not in the clockwise direction from this upright position. Consequently, the boss 44 on any of the accumulating station dogs 24-3 to 24-5, which is moving in the article non-advancing position with return stroke movement of the shuttle mechanism 20, engages the cam means 45 and causes the dog to be set in the full line, article advancing position shown in FIG. 6. It can also be seen from FIG. 6 that the boss 44 of any of the accumulation dogs 24-3 to 24-5, which is in its non-advancing position on an advance stroke of the shuttle mechanism, will engage and pivot the finger 46 counterclockwise without change in the position of the dog.

The dog construction and setting means 42 may also be employed for the dogs 24-1 and 24-2 and the loading and second stations 18-1 and 18-2. Preferably, however, the conveyor construction is simplified by employing dogs 24-1 and 24-2 (arranged in pairs as previously described) which are each connected by a pivot 51 to one of the shuttle bars 32 and biased to the article advancing position by the weight of a portion 52 which constitutes a means for setting each of these dogs in that position on the return stroke of the shuttle mechanism 20.

It will be appreciated that the construction so far described is operable as a simple shuttle conveyor on successive return and advance strokes of the shuttle mechanism 20. For example, with articles 16 at stations 18-1 through 18-4 and the shuttle mechanism in the return position as shown in FIG. 1, the next advance stroke of the shuttle mechanism will place these articles in stations 18-2 through 18-5. On the following cycle of return and advance strokes, all dogs are set in article advancing position on the return stroke and the ensuing advance stroke places the articles in stations 18-3 through 18-6. Under ideal conditions, one article 16 is removed from the unloading station 18-6 and another article is fed to the loading station on each cycle of the shuttle mechanism 20 so that the conveyor may operate in a simple shuttle mode at least until there is no interruption in the unloading operation.

If there is such an interruption, the invention provides accumulation means 54 for resetting the dogs 24-3 to 24-5 at the accumulation stations 18-3 to 18-5 in non-advancing position in response to the presence of articles at those stations, actuating means 56 for operating the accumulation means on an accumulation cycle independently of the operation of the drive means 22 for moving the shuttle mechanism 20, and control means for initiating an accumulation cycle of operation of the accumulation means 54 in response to the presence of articles 16 at the unloading station 18-6 and at the downstream accumulating station 18-5. Operation of the drive means 22 is interrupted during the accumulation cycle.

Referring to FIGS. 1, 4 and 5, the accumulation means 54 comprises an actuator bar reciprocatably mounted on the side plate 26 of the frame 10 at each of the accumulating stations 18-3 to 18-5 to form a series of actuator bars 58-5 to 58-3 extending from the downstream accumulating station 18-5 to the upstream accumulating station 18-3. Each of the actuator bars 58-5 to 58-3 is slidably supported between pairs of guides 59 secured to the side plate 26 by guide caps 60, as shown in FIGS. 4 and 5. The actuating means 56, best shown in FIG. 4, includes a fluid pressure cylinder 62 supported from the frame side plate 26 by a bracket 63 and having a rod 64 connected to the downstream actuator bar 58-5 by a strut 65. The actuator bar 58-5 at the downstream accumulating station 18-5 is thereby movable on an advance motion from the position shown in FIGS. 1 and 4 and a return motion to that position on each accumulation cycle.

Each successive actuator bar 58-4 and 58-3 in the series is movable in response to the advance motion of the downstream actuator bar 58-5 and in response to the presence of an article 16 at each successive accumulating station 18-4 and 18-3. This transmission of motion between successive actuator bars is accomplished by the combination of article sensing means 66-4 and 66-3 at the accumulating stations 18-4 and 18-3, respectively, and a motion transmitter 68-4 and 68-3; the motion transmitter 68-4 being operably associated with the article sensing means 66-4 and with the adjacent pair of actuator bars 58-5 and 58-4, while the motion transmitter 68-3 is operably associated with the article sensing means 66-3 and with the adjacent pair of actuator bars 58-4 and 58-3.

Figure 7:
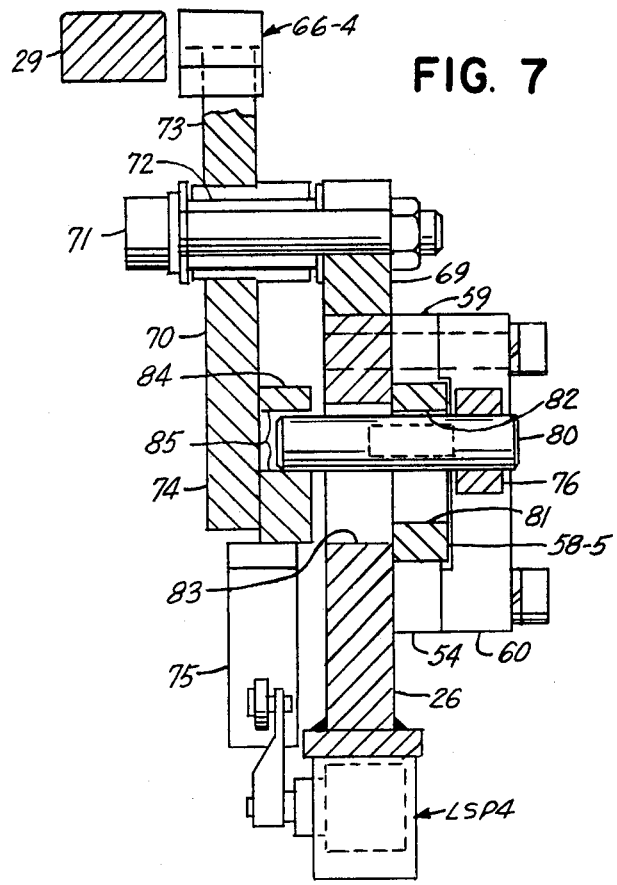
FIG. 7 is a transverse sectional detail, taken substantially as indicated by the line 7—7 of FIG. 4, showing a part sensing member and its relation to the accumulation means.

FIGS. 4 and 7 show the construction of one of the article sensing means 66-4 and motion transmitter 68-4. A sensing member 70, pivotally mounted on a bolt 71 and spacer 72 secured to a bracket 69 on the side plate 26 of the frame 10, has a first arm 73 and a second arm 74 forming a counterweight for normally urging the member 70 to a position in which the first arm 73 projects above the level of the article supporting rails 29 and is engageable by an article.

The motion transmitter 68-4 comprises a link 76 having one end 77 pivotally attached to the upstream actuator bar 58-4 by a bolt 78. A pin 80 carried by the other end of the link 76 engages an elongated slot 81 which is formed in the downstream actuator bar 58-5 and which has a motion transmitting notch 82 extending vertically upwardly from the upstream end of the slot 81. As shown in FIG. 7, the pin 80 projects through an aperture 83 in the frame side plate 26 and slidably engages a positioning member 84 carried by the second arm 74 of the sensing member 70 and having a pair of parallel positioning surfaces 85. When the sensing member 70 is engaged by an article 16, as illustrated at station 18-4 of FIG. 4, the sensing member is pivoted counterclockwise as a result of such engagement and the pin 80 of the link 76 is placed in the motion transmitting notch 82 in the slot 81. Advance motion of the downstream actuator bar 58-5 will then be transmittable to the adjacent upstream actuator bar 58-4 by the pin 80 and link 76. In the absence of an article 16 at the station 18-4, the sensing member 70 will be pivoted in a clockwise direction by the weight of its arm 74 and the weight of the link 76 from the position shown in FIG. 4, and the pin 80 will be placed in the elongated portion of the slot 81 which has a length at least as great as the distance travelled by the downstream actuator bar 58-5 on an advance motion so that this motion will not be transmittable to the upstream actuator bar 58-4.

Figure 8:
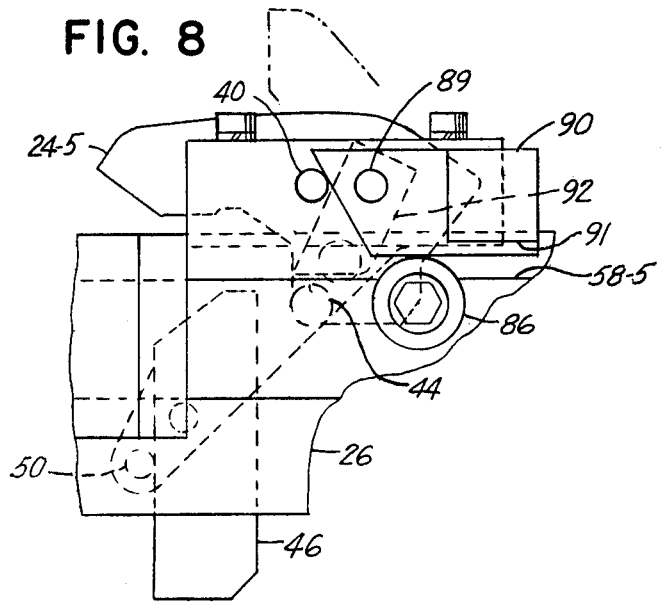
FIG. 8 is a fragmentary side elevation, taken substantially as indicated by the line 8—8 of FIG. 5, showing the dog resetting action of the accumulation means.

Dog resetting means shown in FIGS. 4, 5 and 8 are carried by the frame 10 at each of the accumulating stations 18-3, 18-4 and 18-5 for resetting the dogs 24-3, 24-4 and 24-5 of these stations to non-advancing position each in response to advance motion of the respective actuator bar 58-3, 58-4 and 58-5 of its station. Each of these actuator bars carries an actuator member or roller 86. The fitting 49, attached to the frame side plate 26 at each station and best shown in FIG. 5, has an upper portion 88 in which a shaft 89 is mounted. A crank arm 90 having a counterweight portion 91 is fixed to one end of the shaft 89 and is adapted to be engaged by the actuator member 86 on advance motion of the associated actuator bar. This engagement causes the crank arm 90 to be moved from the generally vertical position shown in FIG. 4 to the horizontal position shown in FIG. 8, thus imparting rocking movement to the shaft 89. A dog engaging member 92 is fixed to and extends radially from the other end of the shaft 89; and, in response to the aforementioned rocking movement of the shaft, the dog engaging member moves from a generally horizontal position shown in FIGS. 4 and 5 to the generally vertical position shown in FIG. 8, contacting the boss 44 on the dog 24-5 to move the dog to non-advancing position. Having been so moved to this position, the dog remains therein until it engages the resetting means 42 on a return stroke of the shuttle mechanism.

The operation of the accumulating shuttle conveyor will be described with reference to FIG. 1 and to the control circuit diagram of FIG. 2. This diagram has for simplicity been reduced to the circuits and control elements primarily involved in the automatic control of the return and advance strokes of the shuttle mechanism 20 and the advance and return motions of the actuator 56 of the accumulation means 54. Those skilled in the art will appreciate that a complete circuit diagram for controlling a conveyor of this type will include such additional components as alternative manual controls, time delay controls between successive cycles, and interlock controls for synchronizing the operation of the conveyor with the operations which precede and follow it. The circuits of FIG. 2 include certain sensing devices, shown in FIG. 1 in the form of limit switches, and certain control elements operated thereby, summarized by their respective functions when energized as follows:

| POSITION SENSORS | |
|---|---|
| LS-1 | actuator 56 is in returned position (normal); |
| LS-2 | actuator 56 is in advanced position; |
| LS-3 | actuator bar 58-3 is in advanced position, thus detecting the presence of an article at each of the accumulating stations 18-3 to 18-5; |
| LS-4 | shuttle mechanism 20 is in advanced position (normal); |
| LS-5 | shuttle mechanism 20 is in returned position; |

| ARTICLE SENSORS | |
|---|---|
| LSP1 | an article 16 is present in station 18-1; |

-continued

| ARTICLE SENSORS | |
|---|---|
| LSP2 | an article 16 is present in station 18-2; |
| LSP5 | an article 16 is present in station 18-5; and |
| LSP6 | an article 16 is present in station 18-6. |

Figure 2:
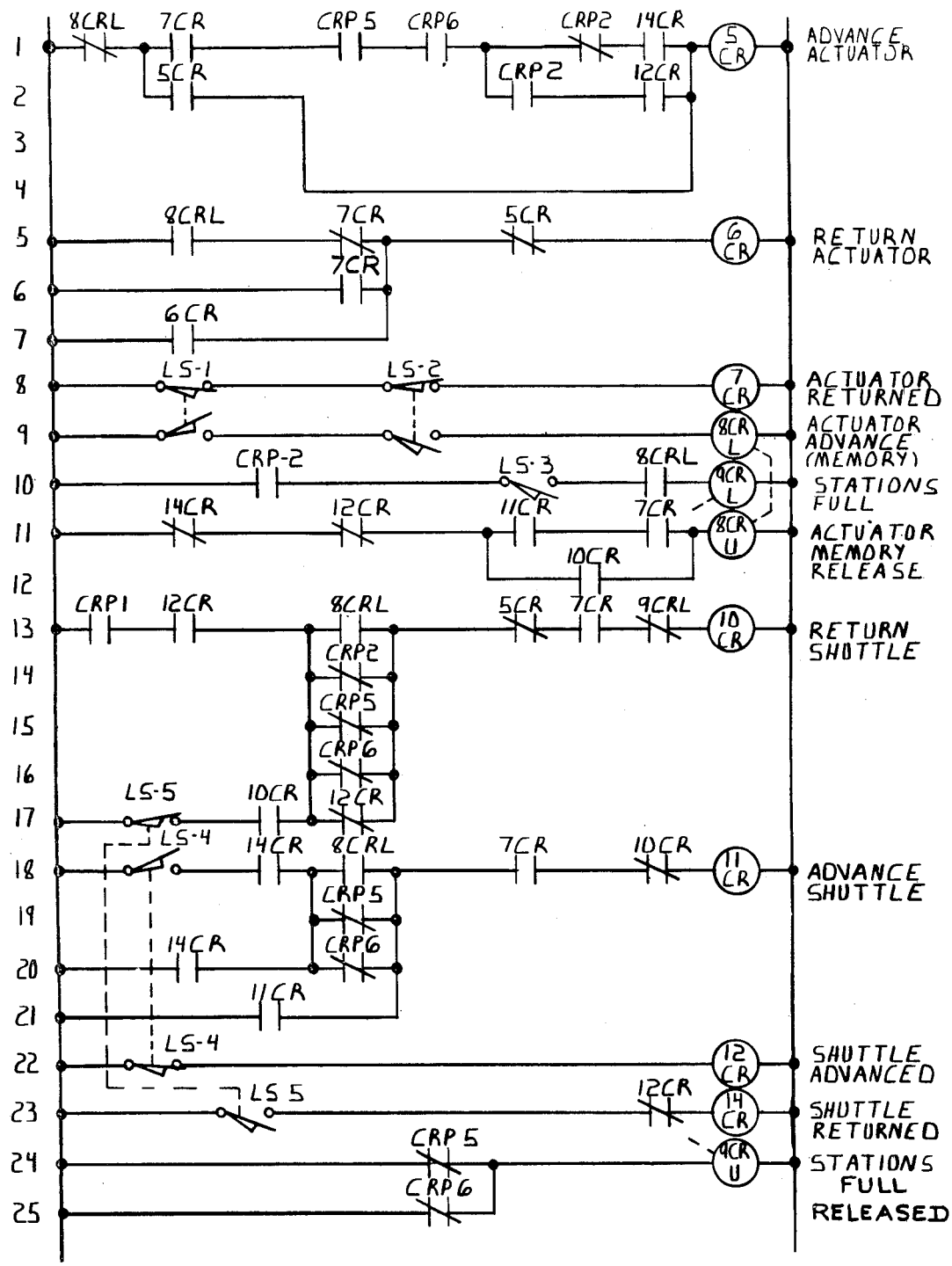
FIG. 2 is a schematic control diagram showing the principal circuits for controlling the shuttle and actuator movements.

Each of the article sensors LSP2, LSP5 and LSP6 is respectively connected to a control relay CRP2, CRP5 and CPR6 which is not shown in FIG. 2. However, the circuits of FIG. 2 do include control or contact elements which are operated by these relays and are correspondingly labelled. These and all other FIG. 2 contact elements are shown in the condition which corresponds to the deenergized state of their respective relays and to the normal positions of the actuator 56 and the shuttle mechanism 20.

Considering the condition of the conveyor as shown in FIG. 1, the actuator 56 is in its normal returned position energizing the actuator returned circuit shown in line 8 of FIG. 2, and the shuttle mechanism 20 is in its returned position energizing the shuttle returned circuit, line 23. Lines 1–4, the actuator advance motion circuit, show that energization of this circuit requires the presence of an article 16 in each of stations 18-5 and 18-6 to close the contacts CRP5 and CRP6 and the shuttle mechanism 20 to be in returned position, closing the contact 14CR; or alternatively, that an article 16 also be present in station 18-2 and the shuttle mechanism to be in advanced position to close the contacts CRP2 and 12CR in line 2. The condition of the LS-4 contacts in lines 18 and 22 and the LS-5 contacts in lines 17 and 23 is reversed in response to the shuttle mechanism being in the returned position. Consequently, the shuttle advance stroke control circuit, lines 18–21, is energized, and the shuttle return stroke control circuit, lines 13–17 is deenergized. Operation of the conveyor continues as follows:

1. shuttle mechanism 20 advances (CRP5 contacts in lines 15 and 19 open, and close in line 1);
2. shuttle mechanism 20 returns;
3. shuttle mechanism advances (CRP6 contact in line 1 closes, open in lines 16 and 20);
   (Assuming that an additional article 16 has not been loaded during the above sequence, an article 16 is now present at each of stations 18-3 to 18-6, but not at station 18-2);
4. shuttle mechanism 20 returns (contact 14CR line 1 closes);
5. actuator 56 advances, moving actuator bars 58-5, 58-4 and 58-3 and resetting dogs 24-5, 24-4 and 24-3 in non-advancing position; LS-1 and LS-2 in line 9 close, and the latch relay 8CRL is energized;
6. actuator 56 returns (line 5);
7. shuttle mechanism 20 advances, but articles 16 in stations 18-5, 18-4 and 18-3 are not moved;
   (Assuming that an additional article 16 has been loaded during steps 1 and 2 above, and an article 16 is now present at each of stations 18-3 to 18-6, and at station 18-2);
8. actuator 56 advances, moving actuator bars 58-5, 58-4 and 58-3; LS-1 and LS-2 in line 9 close, LS-3 in line 10 is closed by the upstream actuator bar 58-3, CRP2, line 10 is closed and the latch relays 8CRL and 9CRL are energized;
9. actuator 56 returns (line 5).

The shuttle mechanism 20 will not now return because of the open CRL contact in line 13 until an article is unloaded from station 18-5 or 18-6, energizing the unlatch relay coil 9CRU, line 24. Thus the drive means 22 has been deactivated by the detecting limit switch LS-3 which is responsive to the operation of the accumulation means 54 and senses the presence of articles at each of the accumulation stations 18-3 to 18-5. This advance and return cycle of the actuator 56 in the advance position of the shuttle mechanism 20 has no effect upon the position of the dogs which are not aligned with the resetting means in this position of the shuttle mechanism.

The overall operation of the conveyor may be summarized as follows, assuming that the actuator 56 is in its normal returned position and that the shuttle mechanism 20 is in its normal advanced position:

A. With no articles present at the unloading and the downstream accumulating stations 18-6 and 18-5, the return stroke control circuit, lines 13–17, and the advance stroke control circuit, lines 18–21, cause the shuttle mechanism 20 to operate on successive return and advance strokes. This cycle repeats and the conveyor operates as a simple shuttle type until—

B. In response to the presence of an article at the unloading and downstream accumulating stations 18-6 and 18-5 (and no article present in station 18-2), an accumulation cycle is initiated in the return position of the shuttle mechanism as sensed by the shuttle mechanism position sensing means LS-5, line 23. The actuator advance motion circuit (lines 1–4) and the actuator return motion circuit (lines 5–7) cause the actuator 56 to move the downstream actuator bar 58-5 on advance and return motions, resetting the dogs at each successive accumulation station in response to the presence of an article thereat. The shuttle mechanism 20 then advances. Cycle B repeats until—

C. In response to the presence of an article at the unloading, downstream accumulating and second stations 18-6, 18-5 and 18-2 respectively, an accumulation cycle is initiated in the advance position of the shuttle mechanism to check the article—occupied status of the accumulating stations. If the presence of articles at each of the accumulation stations is detected, the shuttle mechanism is deactivated, as described above.

Figure 2A:
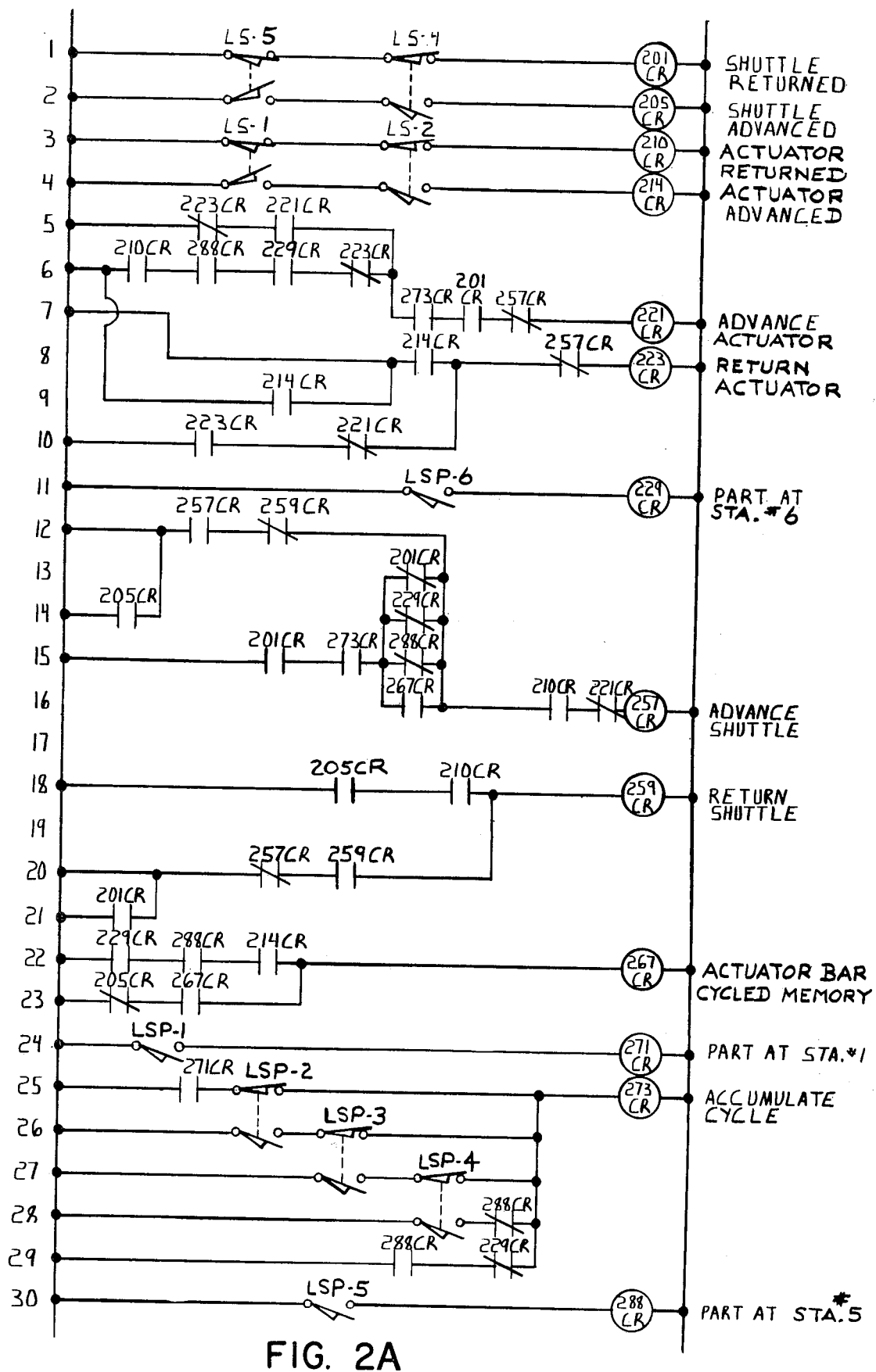
FIG. 2A is a schematic control diagram showing the principal circuits of an alternative control.

The alternative form of control means shown in FIG. 2A employs the same position sensors, except LS-3, and the same article sensors with the addition of an article sensor LSP3 and LSP4 at stations 18-3 and 18-4, respectively. These additional sensors may be provided as illustrated in FIG. 7 for the sensor LSP4, which is mounted on the frame side plate 26 and is actuated by an extension 75 of the lower arm 74 of the sensing member 70.

In the FIG. 2A control means, the normal position of the shuttle mechanism 20 is returned (line 1) and the normal position of the actuator 56 is returned (line 3). With no article present at stations 18-5 and 18-6 (LSP5 and LSP6 open as shown in lines 30 and 11), and with the accumulation cycle control relay 273CR, line 25, energized, the conveyor operates on a simple shuttle cycle as follows:

1. Shuttle mechanism 20 advances (lines 15 and 16 through normally closed contact 229CR, line 14 or 288CR, line 15);

2. Shuttle mechanism 20 returns (line 18).

The relay 273CR is energized by the accumulation cycle control circuit, lines 25–29, in response to at least one of the following conditions:

a. there is an article at station 18-1 but not at station 18-2 (line 25);
b. there is an article at station 18-2 but not at station 18-3 (line 26);
c. there is an article at station 18-3 but not at station 18-4 (line 27);
d. there is an article at station 18-4 but not at station 18-5 (line 28);
e. there is an article at station 18-5 but not at station 18-6 (line 29).

It can thus be appreciated that the accumulation cycle control circuit contains control elements operable by the article sensors and arranged to energize this circuit in response to the presence of an article at one of the successive stations 18-1 to 18-6 which is followed by an empty station. The conveyor will not operate until this condition is met.

The simple shuttle cycle repeats until there are articles present in stations 18-5 and 18-6. Then, with the accumulation cycle control circuit closed and with the shuttle mechanism 20 in returned position, the conveyor operates in an accumulation mode, as follows:

1. Actuator 56 advances (lines 6 and 7 through closed 288CR and 229CR contacts, line 6 and closed 273CR contact, line 7);
2. Actuator 56 returns (line 8);
3. Shuttle mechanism 20 advances (lines 15 and 16 through closed 273CR contact, line 15, and closed 267CR contact, line 16 from actuator cycled memory, line 22);
4. Shuttle mechanism returns (line 18).

If all stations are occupied, or if all stations are empty the accumulate cycle relay 273CR, line 25, is not energized and the conveyor will not operate.

It will be appreciated from the foregoing that a conveyor of the invention requires minimum mechanism for the accumulation means 54 which is operated only when necessary. While the accumulation means disclosed is presently preferred because of its reliability, relative simplicity and the fact that it is carried by the frame 10, not by the shuttle mechanism 20, other forms of accumulation means may be employed and controlled in the manner disclosed. A lift and carry type of shuttle mechanism may also be used where desirable due to the nature of the articles being conveyed.

What is claimed is:

1. An accumulating shuttle conveyor comprising:
   a frame having a loading end and an unloading end;
   means carried by the frame for supporting articles at successive equally spaced stations between the loading and unloading ends, including
      a loading station adjacent to the loading end, a second station adjacent to the loading station, an unloading station adjacent to the unloading end, and
      a plurality of intermediate accumulating stations including an upstream station following the second station and a downstream station preceding the unloading station;
   a shuttle mechanism movably supported by the frame, and drive means normally operable for moving the shuttle mechanism on return and advance strokes between advance and return positions, each stroke having a length corresponding to the spacing between successive stations;
   a series of articles advancing dogs mounted along the shuttle mechanism at a spacing between successive dogs corresponding to the spacing between successive stations, each dog being movable between an article advancing position and a non-advancing position;
   means for setting all dogs in article advancing position on the return stroke of the shuttle mechanism;
   accumulation means for resetting the dogs at said accumulating stations in non-advancing position in response to the presence of articles thereat, said accumulation means including an actuator bar reciprocatably mounted on the frame at each of said accumulating stations to form a series of actuator bars extending from said downstream accumulating station to said upstream accumulating station;
   actuating means for operating said accumulation means in an accumulation cycle independently of the operation of the drive means for moving the shuttle mechanism, said actuating means moving the actuator bar at said downstream accumulating station on an advance motion and a return motion in each said accumulation cycle; and
   control means for initiating an accumulation cycle of operation of said accumulation means between successive strokes of said shuttle mechanism in response to the presence of articles at least at said uloading station and at said downstream accumulating station.

2. A conveyor according to claim 1 wherein said control means further includes first shuttle mechanism position sensing means for initiating an accumulation cycle in the return position of the shuttle mechanism in response to the presence of articles at said unloading and downstream accumulating stations.

3. A conveyor according to claim 2 wherein said control means further includes second shuttle mechanism position sensing means, an article sensor at said second station, said article sensor being combined with at least one of said position sensing means for initiating an accumulation cycle in the advance position of the shuttle mechanism in response to the presence of articles at each of said second, unloading and downstream accumulating stations.

4. A conveyor according to claim 2 wherein said control means further includes an article sensor at each of said successive equally spaced stations and actuator circuit means for initiating an accumulation cycle in response to the presence of articles at said unloading, downstream accumulating and one other of said stations.

5. A conveyor according to claim 4 wherein said control means includes an accumulation cycle control circuit containing control elements operable by said article sensors and arranged to energize the accumulation cycle control circuit in response to the presence of an article at one of the successive stations which is followed by an empty station.

6. A conveyor according to claim 1 wherein said control means includes an article sensor at each of said unloading and downstream accumulating stations;
   drive circuit means for normally activating the drive means on successive return and advance strokes of the shuttle mechanism, said drive circuit means including an advance stroke control circuit and a return stroke circuit;

actuator circuit means for controlling the operation of said actuating means; and control elements in the advance stroke control circuit and in the actuator circuit means, said control elements being operable by the article sensors to inhibit the activation of an advance stroke and to initiate an accumulation cycle in response to the detection by the article sensors of articles at said unloading and downstream accumulation stations.

7. A conveyor according to claim 6 wherein said control means further includes a first position sensor responsive to the shuttle mechanism being in the return position, and the actuator circuit means includes a control element operable by said first position sensor whereby an accumulation cycle is initiated in the return position of the shuttle mechanism.

8. A conveyor according to claim 6 wherein said control means further includes an article sensor at said second station, said return stroke control circuit including control elements to inhibit the activation of a return stroke in response to the detection of an article by each of said article sensors; and, said actuator circuit means further includes a control element operable by the article sensor at said second station whereby an accumulation cycle is alternatively initiated in the advance position of the shuttle mechanism in response to the detection of an article by each of said article sensors.

9. A conveyor according to claim 8 wherein said control means further includes detecting means responsive to the operation of the accumulation means for sensing the presence of an article at each of said accumulating stations, and a control element operable by said detecting means for deactivating the operation of the drive circuit means.

10. A conveyor according to claim 6 wherein said actuating means comprises an actuator for moving the downstream actuator bar on advance and return motions, and means for moving each successive actuator bar in the series in response to movement of the downstream actuator bar and in response to the presence of an article at each successive accumulating station upstream from the downstream accumulating station;

said actuator circuit means including an actuator advance motion circuit and an actuator return motion circuit, said control elements being connected in series in the actuator advance motion circuit.

11. A conveyor according to claim 1 wherein the article advancing dogs at least at each of the accumulating stations are biased to remain in each of said article advancing and non-advancing positions.

12. A conveyor according to claim 11 wherein the article advancing dogs at the loading and second stations are biased to said article advancing positions.

13. An accumulating shuttle conveyor comprising:
a frame having a loading end and an unloading end;
means carried by the frame for supporting articles at successive equally spaced stations between the loading and unloading ends, including
a loading station adjacent to the loading end,
an unloading station adjacent to the unloading end, and
a plurality of accumulating stations including a downstream accumulating station preceding the unloading station and an upstream accumulating station;

a shuttle mechanism movably supported by the frame, and drive means normally operable for moving the shuttle mechanism on return and advance strokes between advance and return positions, each stroke having a length corresponding to the spacing between successive stations;

a series of article advancing dogs mounted along the shuttle mechanism at a spacing between successive dogs corresponding to the spacing between successive stations, each dog being movable between an article advancing position and a non-advancing position;

means for setting all dogs in article advancing position on the return stroke of the shuttle mechanism;

accumulation means for resetting the dogs at said accumulating stations in non-advancing position in response to the presence of articles thereat, said accumulation means comprising:

an actuator bar reciprocatably mounted on the frame at each of the accumulating stations to form a series of actuator bars extending from the downstream accumulating station to the upstream accumulating station;

actuating means operable in an accumulation cycle for moving the actuator bar at the downstream accumulating station on an advance motion and a return motion in each accumulation cycle;

article sensing means at each of the accumulating stations other than the downstream station;

a motion transmitter operably associated with each article sensing means and with each adjacent pair of actuator bars, each motion transmitter being adapted to transmit advance motion of the downstream one of each associated pair of actuator bars to the upstream actuator bar of said pair in response to the presence of an article at the station of the associated article sensing means;

dog resetting means carried by the frame at each of the accumulating stations for resetting the article advancing dog of each such station in non-advancing position in response to advance motion of the actuator bar of each such station; and, control means for initiating an accumulation cycle of operation of said accumulation means between successive strokes of said shuttle mechanism in response to the presence of articles at least at said unloading station and at said downstream accumulating station.

14. A conveyor according to claim 13 wherein each article sensing means comprises a sensing member pivotally mounted on the frame, the sensing member having a first arm and a second arm forming a counterweight for urging the sensing member to a position in which the first arm is engageable by an article, the motion transmitter being operably associated with the second arm.

15. A conveyor according to claim 13 wherein each motion transmitter comprises a link having one end pivotally connected to one of the associated pair of actuator bars, a pin carried by the other end of the link, a slot formed in the other of the associated pair of actuator bars and engaged by the pin, a motion transmitting notch in the slot, and positioning means carried by the second arm of the sensing member for placing the pin in said motion transmitting notch in response to the engagement of the first arm of the sensing member by an article.

16. A conveyor according to claim 15 wherein the link is pivotally attached to the upstream one of the associated pair of actuator bars, the slot is formed in the downstream one of said pair of actuator bars, and the motion transmitting notch extends vertically upwardly from the upstream end of the slot.

17. A conveyor according to claim 16 wherein the positioning means carried by the second arm of the sensing member includes a pair of positioning surfaces slidably engageable by the pin.

18. A conveyor according to claim 13 wherein the dog resetting means at each of the accumulating stations comprises an actuator member carried by the actuator bar of each station, a shaft mounted on the frame, a crank secured to the shaft and adapted to be engaged by the actuator member for imparting rocking movement to the shaft during advance motion of the actuator bar, and a dog engaging member operable to move the dog to non-advancing position in response to such rocking movement of the shaft.

19. A conveyor according to claim 18 wherein the dogs at each of the accumulating stations are biased to remain in each of said article advancing and non-advancing positions.

* * * * *

UNITED STATES PATENT AND TRADEMARK OFFICE
CERTIFICATE OF CORRECTION

PATENT NO. : 4,484,676

DATED : November 27, 1984

INVENTOR(S) : Robert W. Plumridge et al

It is certified that error appears in the above—identified patent and that said Letters Patent is hereby corrected as shown below:

Column 10, line 30 "uloading" should read --unloading--.

Signed and Sealed this

Fourth Day of June 1985

[SEAL]

Attest:

DONALD J. QUIGG

Attesting Officer

Acting Commissioner of Patents and Trademarks